United States Patent
Moulsley et al.

(10) Patent No.: US 8,873,496 B2
(45) Date of Patent: Oct. 28, 2014

(54) CHANNEL STATE FEEDBACK FOR MULTI-CELL MIMO

(71) Applicant: Fujitsu Limited, Kawasaki (JP)

(72) Inventors: Timothy Moulsley, Caterham Surrey (GB); Sunil Keshavji Vadgama, Ashford Middlesex (GB)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 13/755,952

(22) Filed: Jan. 31, 2013

(65) Prior Publication Data

US 2013/0148600 A1    Jun. 13, 2013

Related U.S. Application Data

(63) Continuation of application No. PCT/EP2010/062971, filed on Sep. 3, 2010.

(51) Int. Cl.
*H04W 4/00* (2009.01)
*H04W 72/04* (2009.01)
*H04B 7/02* (2006.01)
*H04B 7/04* (2006.01)
*H04B 7/06* (2006.01)
*H04W 72/00* (2009.01)

(52) U.S. Cl.
CPC .......... *H04W 72/0413* (2013.01); *H04B 7/024* (2013.01); *H04B 7/0417* (2013.01); *H04B 7/0626* (2013.01); *H04B 7/0658* (2013.01)
USPC .......................................... 370/329; 455/450

(58) Field of Classification Search
None
See application file for complete search history.

(56) References Cited

U.S. PATENT DOCUMENTS

| | | | |
|---|---|---|---|
| 7,873,050 B2 * | 1/2011 | Kim et al. | 370/392 |
| 8,107,416 B2 * | 1/2012 | Jeong et al. | 370/328 |
| 8,478,321 B2 * | 7/2013 | Kwon et al. | 455/509 |
| 8,514,738 B2 * | 8/2013 | Chandrasekhar et al. | 370/252 |
| 8,638,746 B2 * | 1/2014 | Papadopoulos et al. | 370/330 |
| 8,665,797 B2 * | 3/2014 | Ding et al. | 370/328 |

(Continued)

OTHER PUBLICATIONS

International search report and written opinion issued for corresponding International Patent Application No. PCT/EP2010/062971, mailed Jun. 7, 2011.
Marvell; "Downlink MIMO with Coordinated Beamforming and Scheduling"; Agenda Item: 7.5.2.2; 3GPP TSG RAN WG1 59; R1-094906; Jeju, South Korea; Nov. 9-14, 2009.

(Continued)

*Primary Examiner* — Clemence Han
(74) *Attorney, Agent, or Firm* — Myers Wolin, LLC

(57) ABSTRACT

A method is disclosed which is intended for use in multiple-input multiple-output wireless communication systems which have a plurality of adjacent cells (cell A, cell B, cell C, cell D), each containing one or more base stations which co-operatively transmit signals to, and receive signals transmitted from, a user equipment (UE). The user equipment is operable to feed back to the relevant base station(s) CSI reports relating to channel(s) between the relevant base station(s) and the users, the base stations are operable to adapt signals for transmission to users, based on the fed back channel state information. The method involves the UE being configured to select at least one cell to be the subject of a CSI report, and to send the CSI report with an indication of the subject cell(s). Feedback overhead on the uplink is reduced when many cells co-operate in transmission to the user equipment.

15 Claims, 7 Drawing Sheets

(56) References Cited

U.S. PATENT DOCUMENTS

| | | | |
|---|---|---|---|
| 8,693,441 B2* | 4/2014 | Wan et al. | 370/332 |
| 8,705,482 B2* | 4/2014 | Sun et al. | 370/329 |
| 8,761,062 B2* | 6/2014 | Chandrasekhar et al. | 370/310 |
| 8,781,005 B2* | 7/2014 | Mallik et al. | 375/259 |
| 8,787,484 B2* | 7/2014 | Liu | 375/267 |
| 2011/0170496 A1* | 7/2011 | Fong et al. | 370/329 |
| 2012/0033624 A1* | 2/2012 | Luo et al. | 370/329 |
| 2012/0224551 A1* | 9/2012 | Ding et al. | 370/329 |

OTHER PUBLICATIONS

3GPP TR 36.814 V0.4.1; 3rd Generation Partnership Project; Technical Specification Group Radio Access Network; "Further Advancements for E-UTRA Physical Layer Aspects (Release 9)"; Feb. 2009.

Markus Herdin; "Correlation Matrix Distance, a Meaningful Measure for Evaluation of Non-Stationary MIMO Channels"; Munich, Germany.

* cited by examiner (a) CoMP JP (b) CoMP CS/CB

*Downlink*  *Uplink*

CHANNEL STATE FEEDBACK FOR MULTI-CELL MIMO

CROSS-REFERENCE TO RELATED APPLICATION

This application is based upon and claims the benefit of priority of the prior International Patent Application No. PCT/EP2010/062971, filed on Sep. 3, 2010, the entire contents of which are wholly incorporated herein by reference.

FIELD OF THE INVENTION

The present invention relates to wireless communication systems, and in particular to multi-cell multiple-input multiple-output ("MIMO") systems in which there is coordination of transmissions between cells, for example systems compliant with the 3GPP Long Term Evolution (LTE), 3GPP LTE-A, IEEE 802.16 and 802.11 groups of standards.

BACKGROUND OF THE INVENTION

Wireless communication systems are widely known in which base stations (BSs) communicate with user equipments (UEs) (also called subscriber or mobile stations) within range of the BSs.

The geographical area covered by one or more base stations is generally referred to as a cell, and typically many BSs are provided in appropriate locations so as to form a network covering a wide geographical area more or less seamlessly with adjacent and/or overlapping cells. (In this specification, the terms "system" and "network" are used synonymously). Each BS divides its available bandwidth, i.e. frequency and time resources, into individual resource allocations for the user equipments. There is a constant need to increase the capacity of such systems, and to improve the efficiency of resource utilisation, in order to accommodate more users, more data-intensive services and/or higher data transmission rates.

OFDM (Orthogonal Frequency Division Multiplexing) is one known technique for transmitting data in a wireless communication system. An OFDM-based communications scheme divides data symbols to be transmitted among a large number of subcarriers, hence the term frequency division multiplexing. Data is modulated onto a subcarrier by adjusting its phase, amplitude, or both phase and amplitude. The "orthogonal" part of the name OFDM refers to the fact that the spacings of the subcarriers in the frequency domain are specially chosen so as to be orthogonal, in a mathematical sense, to the other subcarriers. In other words, they are arranged along the frequency axis such that the sidebands of adjacent subcarriers are allowed to overlap but can still be received without inter-subcarrier interference. In mathematical terms, the sinusoidal waveforms of each subcarrier are called eigenfunctions of a linear channel, with the peak of each sinusoid coinciding with a null of every other sinusoid. This can be achieved by making the subcarrier spacing a multiple of the reciprocal of the symbol period.

When individual subcarriers or sets of subcarriers are assigned to different user equipments, the result is a multi-access system referred to as OFDMA (Orthogonal Frequency Division Multiple Access). The term OFDM as used in the art is often intended to include OFDMA. The two terms may therefore be considered interchangeable for the purposes of the present explanation. By assigning distinct frequency/time resources to each user equipment in a cell, OFDMA can substantially avoid interference among the user equipments within a given cell.

In a wireless communication system such as LTE, data for transmission on the downlink is organised in OFDMA frames each divided into a number of subframes. Various frame types are possible and differ between FDD and TDD for example.

Meanwhile, on the uplink, in view of the relatively unfavourable PAPR (peak-to-average-power ratio) properties of ODMA, an alternative scheme called SC-FDMA (Single Carrier Frequency Division Multiple Access) is used in LTE, which allows a better balance between uplink range and UE amplifier cost. In an SC-FDMA signal, each subcarrier used for transmission contains information of all the transmitted symbols whereas individual subcarriers of an OFDMA signal carry only information on specific symbols.

A technique called MIMO, where MIMO stands for multiple-input multiple-output, has been adopted in several commercial wireless systems including LTE due to its spectral efficiency gain, spatial diversity gain and antenna gain. This type of scheme employs multiple antennas at the transmitter and/or at the receiver (often at both) to enhance the data capacity achievable between the transmitter and the receiver. Typically, this is used to achieve an enhanced data capacity between one or more BSs and the UEs served by the BSs).

By way of example, a 2×2 MIMO configuration contains two antennas at the transmitter and two antennas at the receiver. Likewise, a 4×4 MIMO configuration contains four antennas at the transmitter and four antennas at the receiver. There is no need for the transmitter and receiver to employ the same number of antennas. Typically, a BS in a wireless communication system will be equipped with many more antennas in comparison with a UE (such as, for example, a mobile handset), owing to differences in power, cost and size limitations.

The term channel is used to describe the frequency (or equivalently time delay) response of the radio link between a transmitter and a receiver. The so-called MIMO channel (or "channel") contains all the subcarriers (see the discussion on subcarriers above), and covers the whole bandwidth of transmission. A MIMO channel contains many individual radio links. The number of these individual radio links, which may be individually referred to as single-input single-output (SISO) channels (also called subchannels), is $N_r \times N_T$, where $N_T$ is the number of antennas at the transmitter and $N_r$ is the number of antennas at the receiver. For example, a 3×2 MIMO arrangement contains 6 links, hence it has 6 SISO channels.

Considering the simplified 2×3 MIMO system schematically represented in FIG. 1, it can be seen that antenna R0 of receiver R receives transmissions from each of the transmitter antennas T0, T1 and T2 of transmitter T. Similarly, receiver antenna R1 receives transmissions from transmitter antennas T0, T1 and T2. Therefore, the signal received at the receiver comprises (or is made up of) a combination of the transmissions (i.e. of the SISO channels) from the transmitter antennas. In general, SISO channels can be combined in various ways to transmit one or more data streams to the receiver.

The number of simultaneously transmitted streams the MIMO channel can support is commonly referred to as the "channel rank", and the number of streams actually transmitted is referred to as "transmission rank". The transmission rank typically needs to be adapted to suit the current channel characteristics and hence avoid excessive inter-stream interference. A more general definition of transmission rank is the number of complex-valued independent modulation symbols transmitted per time-frequency resource.

FIG. 2 is a conceptual diagram of a more generalized MIMO system. In FIG. 2, a transmitter transmits signals utilizing $N_T$ transmitting antennas, and a receiver receives the signals from the transmitter utilizing $N_r$ receiving antennas. In order to create a mathematical model of the characteristics of the overall MIMO channel, it is necessary to represent the individual SISO channels between the transmitter and receiver. As shown in FIG. 2, the individual SISO channels are represented by $H_{0,0}$ to $H_{N_r-1,N_T-1}$, and as suggested in the Figure, these form terms of a matrix commonly called the channel matrix or channel response matrix H. It will be recognised that $H_{0,0}$ represents the channel characteristics (for example, channel frequency response) for transmitting signals from the transmitting antenna 0 to the receiving antenna 0. Similarly, "$H_{N_r-1, N_T-1}$" represents the channel characteristics for transmitting signals from the transmitting antenna $N_T-1$ to the receiving antenna $N_r-1$, and so on.

In FIG. 2, the symbols $x_0$ to $x_{N_T-1}$, which represent the signal elements transmitted using the transmitting antennas 0 to $N_T-1$, together form a transmitted signal vector $\underline{x}$ (i.e. $\underline{x}=(x_0, x_1, x_2, \ldots, x_{N_T-1})^T$), where ( )$^T$ indicates the vector transpose. Likewise, the received signals elements $y_0$ to $y_{N_r-1}$ received by receiving antennas 0 to $N_r-1$ together form a received signal vector $\underline{y}$ (i.e. $\underline{y}=(y_0, y_1, y_2, \ldots y_{N_r-1})^T$). The relationship between the vectors $\underline{y}$ and $\underline{x}$ for the simplified system shown in FIG. 2 (and also that shown in FIG. 3) may be modeled by the basic MIMO system equation:

$$\underline{y}=H\underline{x}+\underline{n} \qquad (I)$$

where H is the channel matrix described above and $\underline{n}$ is a vector representing noise. Noise elements $n_0$ to $n_{N_r-1}$ are illustrated in FIG. 2 and represent noise in the respective received signal elements $y_0$ to $y_{N_r-1}$. Hence, the noise vector $\underline{n}$ is given by $\underline{n}=(n_0, n_1, n_2, \ldots, n_{N_r-1})^T$.

It should be noted that, despite the name "multiple-input multiple-output", MIMO systems can operate even if one of the transmitter and the receiver has only one antenna (i.e. even if $N_T=1$ or $N_r=1$).

MIMO transmission schemes may be described as "non-adaptive" and "adaptive". In the non-adaptive case, the transmitter does not have any knowledge of the channel properties and this limits performance, as it cannot take account of changes in conditions which cause changes in the state of the channel. Adaptive schemes rely on channel knowledge which may be obtained, for example, by the feedback of information (channel-state information or CSI) from the receiver to the transmitter, allowing modification of the transmitted signal to account for changing conditions and to maximise data throughput. Adaptive MIMO schemes may be further described as "closed-loop" (i.e. operating with the benefit of channel state feedback) or "open-loop" (i.e. without channel state feedback). A combination is possible in the sense that the scheme may be "closed-loop" with respect to some aspects (e.g. feedback of received power") and "open-loop" with respect to other aspects (e.g. no feedback related to the channel matrix). The present invention is concerned primarily with closed-loop MIMO schemes.

The feedback just described is important, in particular, in so called FDD (Frequency Division Duplex) systems, where uplink transmissions (i.e. transmissions from user equipment to base station) and downlink transmissions (vice-versa) employ two different carrier frequencies. Because of the frequency change, the uplink and downlink channels are different and CSI needs to be fed back in order to provide an adaptive scheme; in particular so that the transmitter can perform so-called "link adaptation" in order to account for channel variations (such as changes in the channel state) when transmitting signals. On the other hand, in so-called TDD (Time Division Duplex) systems, the uplink and downlink are transmitted in two adjacent time slots on the same frequency. The two time slots are generally within the channel coherence time, meaning that it can be reasonably assumed (e.g. with the same antennas used in the uplink and downlink directions) that the channel state does not change, so information relating to the channel matrix need not be fed back. The transmitter can estimate the channel from the received signal on the reverse link, usually aided by the insertion of pilots or known waveforms by the transmitter into the signal sent on the reverse link. This is often referred to as "uplink sounding". However, it may not always be desirable to incur the overhead of uplink sounding, in which case closed-loop techniques offer an alternative.

FIG. 3 is a diagram representing a MIMO system similar to that shown in FIG. 1, but more generalised. MIMO system 1 comprises a transmitter 2 which comprises a plurality of transmitting antennas (0), (1), . . . , ($N_T$–1) and a receiver 3 which comprises a plurality of receiving antennas (0), (1), . . . , ($N_r$–1). The transmitter 2 transmits symbols 0, 1, . . . , $N_T$–1 using the $N_T$ transmitting antennas. The symbols can be created from one data stream, referred to as vertical encoding, or different data streams, referred to as horizontal encoding. In addition, each transmitted symbol corresponds to, for example, one-bit data if the modulation method is binary phase-shift keying (BPSK), or corresponds to two-bit data if the modulation method is quadrature phase-shift keying (QPSK). These concepts will be familiar to those skilled in the art. The receiver 3 receives the signals transmitted from the transmitter 2 using the $N_r$ receiving antennas, and it comprises a signal regeneration unit 4 which regenerates the transmitted symbols from the signals received.

As indicated by the arrows in FIG. 3, the signals transmitted from a plurality of the transmitting antennas are received by a plurality of receiving antennas, giving rise to $N_r \times N_T$ possible subchannels in total. In other words, the signals transmitted from the transmitting antenna (0) are received by receiving antennas (0) through ($N_r$–1), the signals transmitted from the transmitting antenna (1) are received by receiving antennas (0) through ($N_r$–1), etc. The characteristics of the subchannel which propagates the signals from the i-th transmitting antenna to the j-th receiving antenna are expressed as "$H_{ji}$" and form one component term of the $N_r \times N_T$ channel matrix H.

The maximum number of independent data streams that can be usefully transmitted in parallel over the MIMO channel is given by the lower of $N_T$ and $N_r$ and is further limited by the rank of the matrix H. The transmission quality depends on the matrix H and, for example, degrades significantly in case the singular values of the matrix are not sufficiently strong, such as where antennas are not sufficiently de-correlated, for example in an environment with little scattering or when antennas are physically close together.

In LTE, up to 2 code words can be mapped onto different so-called layers. The number of layers for transmission is typically chosen to be less than or equal to the rank of the matrix H, and there is a fixed mapping between code words to layers. Precoding on the transmitter side can be achieved by applying a precoding matrix W to the signal before transmission. The optimum available precoding matrix W is selected from a predefined "codebook", which is known at both the base station(s) and UE side. The UE selects the optimum available precoding matrix (the one offering the highest data rate) based on its knowledge of the channel, and indicates its preferred precoding matrix to the transmitter side, via a precoding matrix index (PMI) for example. PMI is one kind of channel state information (CSI) mentioned earlier. Note that in LTE, while the precoder used at the BS is likely to be designed on the basis of the UE feedback, this precoder is not necessarily restricted to be one of codebook entries.

By way of further background explanation, a MIMO-OFDM transmitter and a MIMO-OFDM receiver will be briefly outlined with reference to FIGS. 4 and 5 respectively. In the OFDM transmitter schematically shown in FIG. 4, high-speed binary data is encoded (convolutional code is an example), interleaved, and modulated (using a modulation scheme such as BPSK, QPSK, 64QAM, and the like). Independent channel encoders may be used for each transmitting antenna. Subsequently, the data is converted into parallel low-speed modulated data streams which are fed to M subcarriers. The output from each encoder is carried separately on a plurality of subcarriers. The modulated signals are frequency-division multiplexed by M-point Inverse Fast Fourier Transform (IFFT) and the guard interval is added. The resulting OFDM signal is converted into an analog signal by a D/A converter and is upconverted into RF band and transmitted over the air.

At the MIMO-OFDM receiver schematically shown in FIG. 5, the received signals from the $N_r$ receiver antennas are filtered by a band pass filter (BPF), and then down-converted to a lower frequency. The down-converted signal is sampled by ND converter (namely, converted into a digital signal), and the guard interval is removed before the sampled data is fed to the M-point Fast Fourier Transformer (FFT). After Fourier transformation is performed on each of the signals received through the $N_r$ receiver antennas, they are fed to the MIMO signal processing unit 11. The MIMO signal processing unit 11 comprises the signal regeneration unit 4 (as shown in FIG. 3) which performs processing to compensate for the channel characteristics.

It should be noted that, for the purposes of explanation, the above discussion focused mainly on the case of a single transmitter sending MIMO signals to a single receiver or in other words to a set of antennas in one location (so-called Single User or SU-MIMO), but of course practical MIMO wireless communication systems are generally much more elaborate than this, providing many mutually adjacent cells in which base stations transmit over respective MIMO channels to one or more UEs simultaneously. In fact, the present invention is largely directed at these more elaborate systems, and issues associated with them, as discussed below. The term Multi-User MIMO or MU-MIMO refers to techniques which rely on precoding to exploit the geographical separation of users' respective antennas, allowing signals to be transmitted to and received from a plurality of user equipments in the same frequency band simultaneously.

As explained above, the means by which frequency resources are utilised in conventional MIMO schemes prevents or significantly limits interference among user equipments within a given cell. In other words, intra-cell interference is substantially avoided. However, in the more elaborate multi-cellular networks discussed in the previous paragraph, the benefits of MIMO transmission can often be limited by inter-cell interference.

Inter-cell interference may arise, for example, because the frequency resources (i.e. the carriers and subcarriers) utilised by base stations in transmitting data to user equipments in one cell are identical to the frequency resources utilised by base stations in transmitting data to user equipments in an adjacent cell. In other words, in the kinds of wireless communication systems in which the present invention may find use, there is likely to be, using terminology common in the art, 1:1 frequency reuse between adjacent cells. The effect of this can be particularly significant for so-called "cell-edge users" located near the boundary between cells. For a cell-edge user, the distance to the one base station currently serving that user equipment may be roughly the same as, or only marginally different to, the distances to the base stations that are in adjacent cells. It should also be noted that the received signal strength is typically highly correlated with distance. As a result, from the point of view of the user equipment near the cell edge, the signal strength received from the serving base station may be only marginally stronger than, or approximately the same as, the signal strength from the base stations in the adjacent cells, as seen by the cell-edge user. And because common frequency resources may be used in adjacent cells (i.e. there is simultaneous use of substantially identical transmission frequencies in adjacent cells), signals being transmitted in the adjacent cells can often interfere with data being transmitted to the cell-edge user.

One method which has been proposed for addressing this difficulty is to coordinate the MIMO transmissions among multiple base stations (i.e. coordinating transmissions in adjacent or nearby cells) to eliminate or reduce this inter-cell interference. A full explanation of the techniques employed to achieve this coordination is not necessary for the purposes of this explanation. For present purposes it is sufficient to note that this coordination can reduce or eliminate inter-cell interference among coordinated cells (or coordinated portions of cells) and this can result in a significant improvement in the coverage of high data rates, cell-edge throughput and/or overall system throughput. However, the trade-off for this improvement is that the coordination of transmissions in multi-cellular MIMO systems requires channel state information (CSI) and data information to be shared among the coordinated base stations. This in turn results in a significant additional burden on the system's transmission and data capacity resources. In particular, for FDD systems, base station channel knowledge is mainly obtained by user equipment (UE) feedback (UE feedback is also useful in TDD-based systems). Since multiple cells or sectors participate in the coordinated transmission, the amount of channel knowledge required to be fed back increases linearly with the number of cooperating cells (or the number of cooperating cell sectors). In other words the UE may need to feed back information on each cell participating in the coordinated transmission, to the base stations providing those cells. It will be appreciated that this can place a heavy burden on the uplink channel particularly.

As explained in the previous paragraph, coordinated multi-cell MIMO transmission/reception (also often referred to as coordinated multi-point transmission/reception or CoMP) may be used to improve the coverage of high data rates, cell-edge throughput and/or to increase system throughput. The downlink schemes used in CoMP may be considered to fall into the following two categories:

"Coordinated Scheduling and/or Coordinated Beamforming (CS/CB)" and

"Joint Processing/Joint Transmission (JP/JT)".

An additional technique which may be employed is aggregation of multiple carriers (CA) to increase the available peak data rate and allow more complete utilisation of available spectrum allocations.

Incidentally, those skilled in the art will be generally familiar with the basics and underlying principles of beamforming, which is a signal processing technique that makes use of constructive and destructive interference to assist with directional signal transmission and/or reception. Further explanation of beamforming is therefore not required here.

In CS/CB, data to a single UE is transmitted from one transmission point, but decisions regarding user scheduling (i.e. the scheduling of timings for transmissions to respective user equipments) and/or beamforming decisions are made with coordination among the cooperating cells (or cell sectors). In other words, scheduling/beamforming decisions are made with coordination between the cells (or cell sectors) participating in the coordinated scheme so as to prevent, as far as possible, a single UE from receiving signals from more than one transmission point.

On the other hand, in JP/JT, data to a single UE is simultaneously transmitted from multiple transmission points to (coherently or non-coherently) improve the received signal quality and/or cancel interference for other UEs. In other words the UE actively communicates in multiple cells and with more than one transmission point at the same time.

Further details of CoMP as applied to LTE can be found in the document:

3GPP TR 36.814: "Further advancements for E-UTRA physical layer aspects (Release 9)", V1.0.0, 26.02.200926

In CA, discrete frequency bands are used at the same time (aggregated) to serve the same user equipment, allowing services with high bandwidth demands (up to 100 MHz) to be provided. CA is a feature of LTE-A (LTE-Advanced) which allows LTE-A-capable terminals to access several frequency bands simultaneously whilst retaining compatibility with the existing LTE terminals and physical layer. CA may be considered as a complement to JP for achieving coordination among multiple cells, the difference being (loosely speaking) that CA requires coordination in the frequency domain and JP in the time domain.

FIG. 6 schematically illustrates the working principles of the two above-mentioned categories of downlink transmission used in CoMP, although it should be noted that the way the base stations are illustrated relative to the distribution of the cells in FIG. 6 may not reflect the true distribution of base stations vis-à-vis cells in a practical wireless communication system. In particular, in a practical wireless communication system, the cells extend further than the hexagons shown in the Figure so as to overlap to some extent, allowing a UE to be within range of more than one base station at the same time. Furthermore, it is possible, in LTE for example, for the same base station (eNodeB) to provide multiple overlapping cells. Nevertheless, FIG. 6 is sufficient for present purposes to illustrate the principles of CS/CB and JP downlink transmission schemes respectively, used in CoMP.

Joint Processing (JP) is represented in FIG. 6(a) in which cells A, B and C actively transmit to the UE, while cell D is not transmitting during the transmission interval used by cells A, B and C.

Coordinated scheduling and/or coordinated beamforming (CS/CB) is represented in FIG. 6(b) where only cell B actively transmits data to the UE, while the user scheduling/beamforming decisions are made with coordination among cells A, B, C and D so that the co-channel inter-cell interference among the cooperating cells can be reduced or eliminated.

In the operation of CoMP, UEs feed back channel state information. The channel state information is often detailed, and often includes measurements of one or more of channel state/statistical information, narrow band Signal to Interference plus Noise Ratio (SINR), etc. The channel state information may also include measurements relating to channel spatial structure and other channel-related parameters including the UE's preferred transmission rank and precoding matrix.

As explained above, feedback of channel state information allows modification of the transmitted signal (typically modification by the base station(s) prior to transmission) to account for changing channel conditions and to maximise data throughput. More specifically, it is often done in order to perform precoder design, link adaptation and scheduling at the base stations. As also explained above, for FDD systems, to achieve equivalent detail of channel knowledge for each cell, the total amount of channel information needed to be fed back increases linearly with the number of cooperating cells (or sectors of cells), and this creates a heavy additional burden for the uplink channel particularly.

Conventionally, CSI reporting is provided for without taking into account multiple cells or their relative significance in communications with a specific UE. However, as explained above, in CoMP there is coordination between cells, and in fact, in the case of the joint processing (JP) downlink transmission scheme discussed above, data to a single UE is simultaneously transmitted from multiple transmission points. Note that "coordination between cells" could be understood to include cells on different carrier frequencies (i.e., CA), which may be supported by one base station or a number of co-located base stations, as well as cells supported by geographically-separated base stations (i.e., COMP).

Therefore, it its worth Investigating feedback schemes that can more appropriately deal with a UE's communications with multiple cells, and which can save the feedback overhead for the uplink channel used for multi-cell DL MIMO transmissions.

SUMMARY OF THE INVENTION

According to a first aspect of the present invention, there is provided a method for use in a multiple-input multiple-output communication network in which:

the network comprises a plurality of cells provided by one or more base stations operable to transmit signals on at least one downlink to, and receive signals on at least one uplink from, a user equipment, the user equipment is operable to feed back to the network reports on channel state information, CSI, for one or more of the cells; and base stations are operable to adapt downlink signals to the user equipment based on the CSI reports, the method comprising:

the user equipment selecting at least one cell to be the subject of a CSI report, and sending the CSI report for the subject cell(s).

In this way, when multiple cells co-operate in transmission to the user equipment, the amount of CSI reports can be reduced compared with the case where every cell is the subject of a CSI report. This can reduce the amount of uplink resource used for feeding back CSI. Incidentally, the term "CSI report" would normally be understood to refer to CSI of a specific cell, but in the present invention it is possible for the CSI for multiple cells to be reported either by way of a single, combined report or by individual reports for each cell. The selecting step may be repeated, starting with a "best" cell (see below) and then reporting on one or more other cells. The report need not be sent directly to the base station of the cell(s) concerned.

The CSI report is preferably sent along with (for example as part of the CSI report itself) an indication of the cell(s) covered by the report.

In the above method, preferably, the selecting step selects the subject cell(s) by taking account of one or more of:

user equipment location;

user equipment status;
cell status;
carrier frequency of the cell;
cell identity;
channel state of a cell;
change in user equipment location;
change in user equipment status;
change in cell status;
time elapsed since a CSI report for a cell; and
receipt of a CSI reference signal for a cell.

The channel state of a cell can be taken account of according to one or more of the following criteria:
expected data rate of communication with the cell;
channel matrix for the cell;
channel spatial structure;
signal to interference ratio, SIR, signal to noise ratio, SNR, or signal to interference plus noise, SINR
transmission rank preferred by the user equipment
transmission mode preferred by the user equipment;
preferred precoding matrix of the user equipment;
expected data rate;
rate of change of channel state;
function of channel state at two or more timings.

Preferably the selecting step includes finding, as a candidate subject of the CSI report, a "best" cell with which the user equipment should communicate. The "best" cell may be, for example, the cell for which the expected data rate to the UE concerned is the highest among all cells with which the UE is in communication. This avoids wasting resources on CSI reports for cells which are of little or no significance for the current user communications.

The expected data rate may be determined based not only on the channel matrix, but also on such factors as: the SINR at the receiver; the resources assumed to be available such as transmission bandwidth; and the cell status such as a number of subframes available for transmission. The instantaneous bit rate could be considered, or an average over a given time period. The "best" cell may also be determined according to criteria such as the maximum achievable data rate; the expected data rate; and/or the expected spectral efficiency (i.e. the total bit rate divided by the transmission bandwidth used).

When the criteria used include rate of change of channel state, the selecting step preferably includes selecting at least one other cell as subject of the CSI report in the event that the rate of change of channel state of the best cell is below a threshold. Thus, in the event that the channel of the "best" cell is changing only slowly or not at all, or where a CSI report has only recently been sent for the "best" cell, the CSI report is made more effective by focusing on another cell where the channel may be changing more quickly, and/or for which the CSI is relatively out of date. More particularly, the user equipment preferably selects, as the subject of the CSI report, the cell for which updating the CSI would give the largest increase in total data rate which can be achieved based on the information available at the base station.

When the selecting step takes into account user equipment location, this may involve, for example, determining that the user equipment has entered a coverage area of a cell.

Taking into account user equipment status may include determining a number of transceivers available at the user equipment and/or a change at the application level at the user equipment.

To take into account cell status, the selecting step may consider one or more of the following criteria:
number of available transmit antennas at a base station;
number of available downlink subframes;
the ability of a cell to support a particular data rate;
the traffic loading of a cell;
change in number of available transmit antennas of the base station;
change in number of available downlink subframes; and
activation or deactivation of carriers in carrier aggregation.

In one embodiment the selecting and sending steps are user equipment-initiated. This allows any network-commanded periodic or aperiodic CSI reports to be employed less frequently.

Alternatively the selecting and sending steps are responsive to a trigger (explicit or implicit) from the network, such as at least one reference signal received by the user equipment. For example, the network may send reference signals to the user equipment for each cell, and the user equipment responds to receipt of the reference signals on a selective basis by sending, instead of CSI reports for all cells, a CSI report for the "best" cell and thereafter a CSI report for at least one other cell. This ensures that the CSI report for the best cell is the most timely.

The indication of the subject cell(s), provided with the CSI report, may be an implicit indication, based on for example the timing of the CSI report (in the case of a periodic report), or based on the cell used to transmit the report.

Alternatively, the indication of the subject cell(s) is an explicit indication made by setting one or more values, fields or bits of the CSI report to an appropriate value. For example, an existing CSI message defined in LTE may be modified by using reserved bits, replacing some existing bits or by extending the message format to accommodate new bits.

Where the CSI report covers more than one subject cell, the CSI report preferably indicates the number of cells covered in addition to specifying the identity of each cell.

According to a second aspect of the invention, there is provided a user equipment, UE, for use in a multiple-input multiple-output communication network in which:
the network comprises a plurality of cells provided by one or more base stations operable to transmit signals on at least one downlink to, and receive signals on at least one uplink from, the UE,
the UE is operable to feed back to the network reports on channel state information, CSI, for one or more of the cells; and
base stations are operable to adapt downlink signals to the UE based on the CSI reports;
the UE being configured to select at least one cell to be the subject of a CSI report, and to send the CSI report for the subject cell(s).

The UE preferably also sends an indication of which cell(s) is/are the subject of the CSI report, and preferably also an indication of how many cells are covered by the report.

The above-defined UE and BS may be configured to provide any of the features enumerated above with regard to the method of the invention.

Further aspects of the present invention may provide a wireless communication system arranged to operate in accordance with any of the above methods, as well as software for allowing transceiver equipment equipped with a processor to provide the UE or BS as defined above. Such software may be recorded on a computer-readable medium.

In general, and unless there is a clear intention to the contrary, features described with respect to one aspect of the invention may be applied equally and in any combination to any other aspect, even if such a combination is not explicitly mentioned or described herein.

As is evident from the foregoing, the present invention involves signal transmissions between base stations and user equipments in a multiple-input multiple-output (MIMO) wireless communication system. A base station may take any form suitable for transmitting and receiving such signals. It is envisaged that the base stations will typically take the form proposed for implementation in the 3GPP LTE, 3GPP LTE-A, IEEE 802.16 and 802.11 groups of standards, and may therefore be described as a NodeB or an eNodeB (eNB) (which term also embraces Home eNodeB or HeNB) as appropriate in different situations. However, subject to the functional requirements of the invention, some or all base stations may take any other form suitable for transmitting and receiving signals from user equipments, and for adapting signals for transmission to user equipments based on fed back channel state information.

Similarly, in the present invention, each user equipment may take any form suitable for transmitting and receiving signals from base stations. For example, the user equipment may take the form of a subscriber station (SS), or a mobile station (MS) or any other suitable fixed-position or movable form. For the purpose of visualising the invention, it may be convenient to imagine the user equipment as a mobile handset (and in many instances at least some of the user equipments will comprise mobile handsets), however no limitation whatsoever is to be implied from this.

In the wireless communication system, the arrangement of base stations with respect to each other may define the layout of the cells (and the sectors of the cells). The invention is not necessarily limited to any particular base station arrangement or cell layout.

BRIEF DESCRIPTION OF THE DRAWINGS

Reference is made, by way of example only, to the accompanying drawings in which.

DETAILED DESCRIPTION

Figure 1:
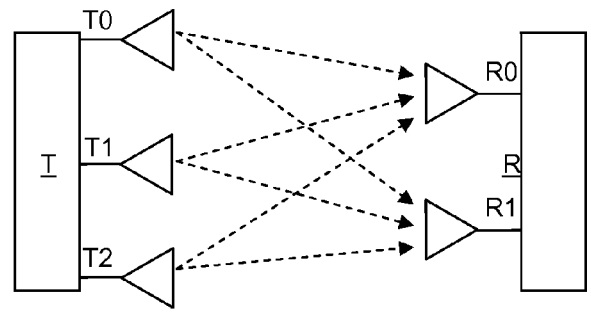
FIG. 1 is a schematic representation of a simplified 2×3 MIMO system and the individual SISO channels between the respective transmitter and receiver antennas.
Figure 2:
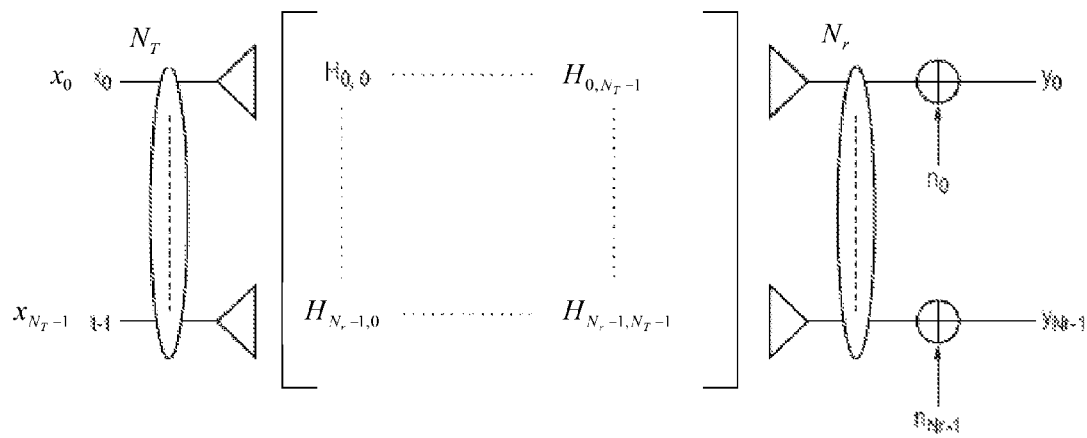
FIG. 2 is a conceptual diagram of a more generalized MIMO system in which the transmitter has $N_T$ transmitting antennas, and the receiver has $N_r$ receiving antennas.
Figure 3:
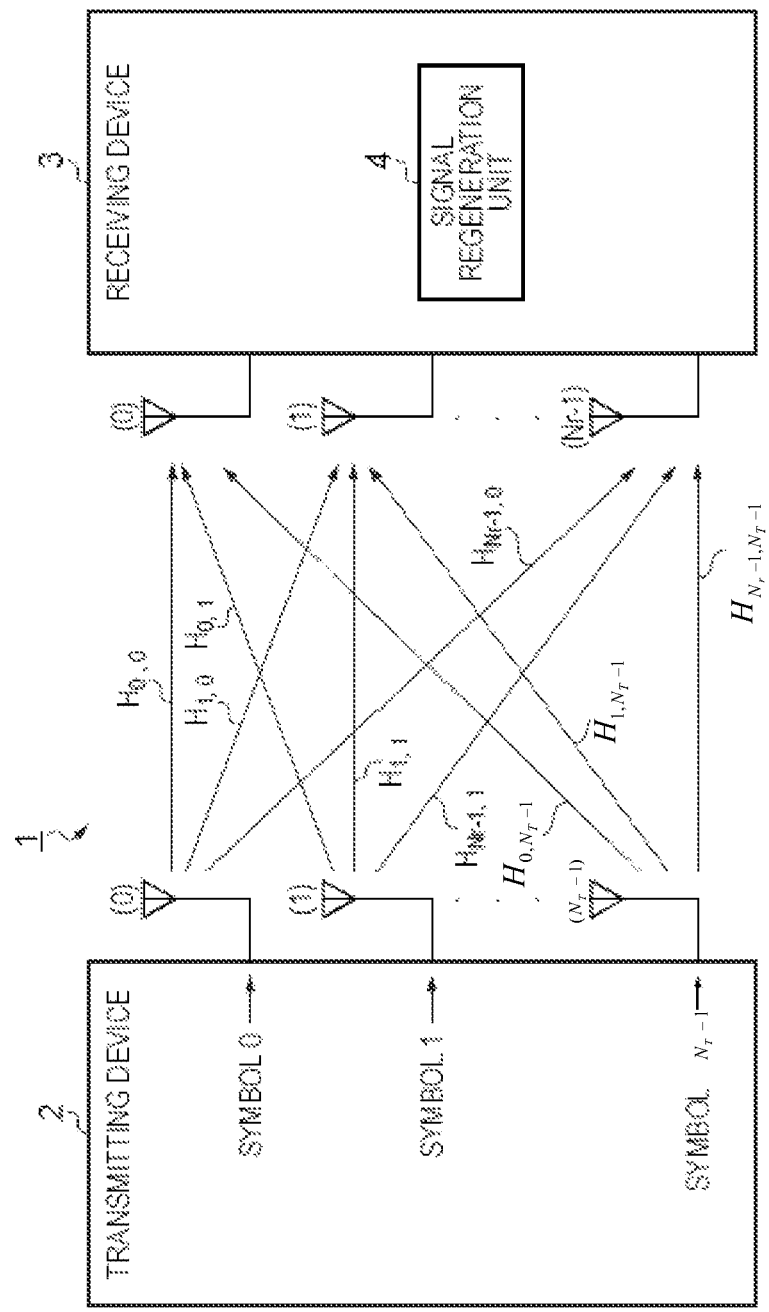
FIG. 3 is a schematic representation system similar to that given in FIG. 1, but relating to a more generalised MIMO system.
Figure 4:
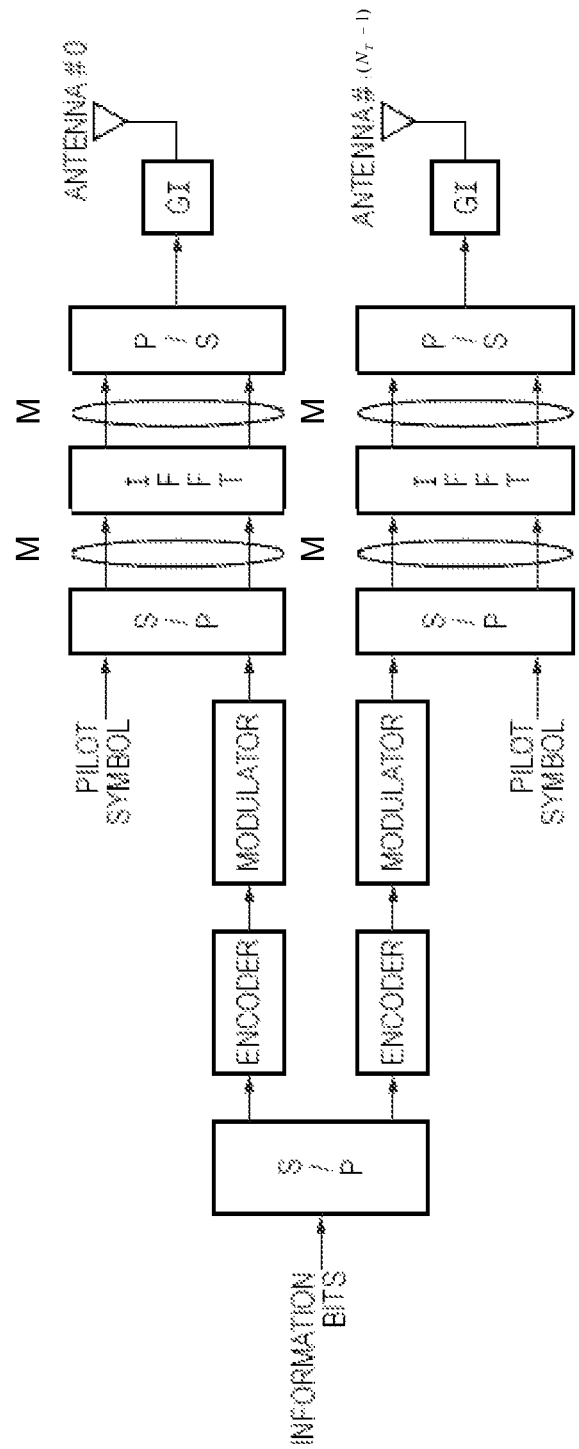
FIG. 4 is a schematic representation illustrating certain important functional components of a MIMO-OFDM transmitter.
Figure 5:
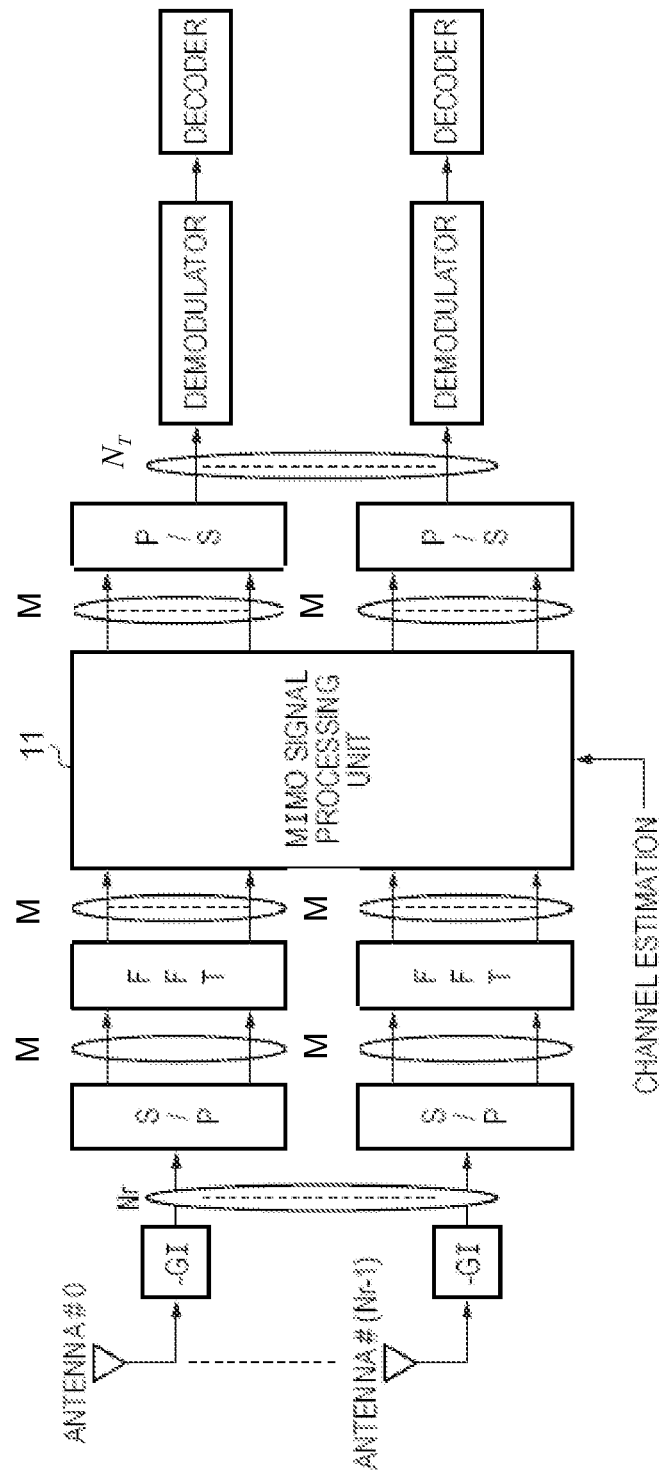
FIG. 5 is a schematic representation illustrating certain important functional components of a MIMO-OFDM receiver.
Figure 6:
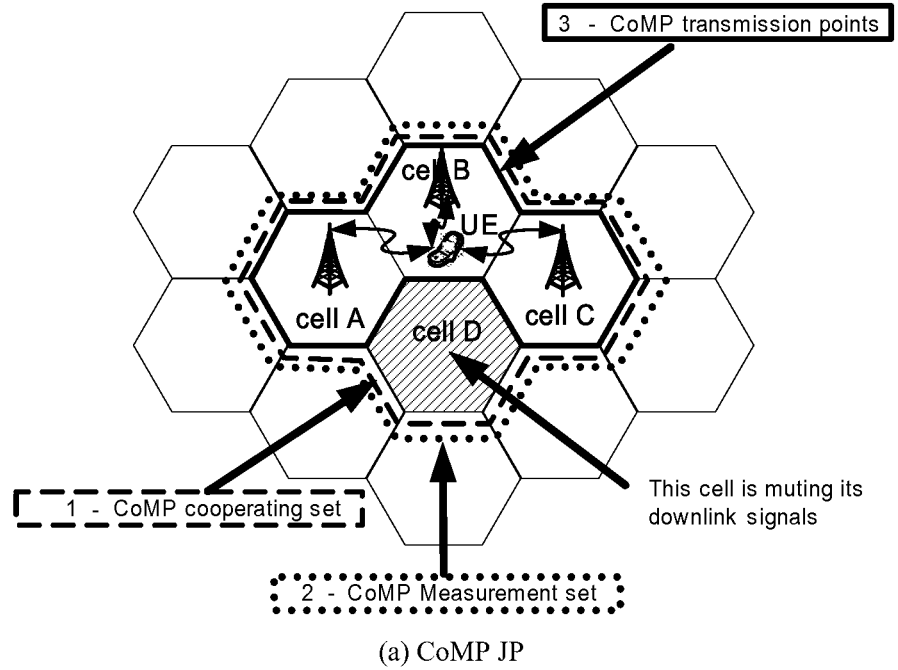
FIG. 6(a) schematically illustrates the working principles of so-called joint processing (JP) downlink transmission used in CoMP.
FIG. 6(b) schematically illustrates the working principles of so-called coordinated scheduling and/or beamforming (CS/CB) downlink transmission used in CoMP.
Figure 6:
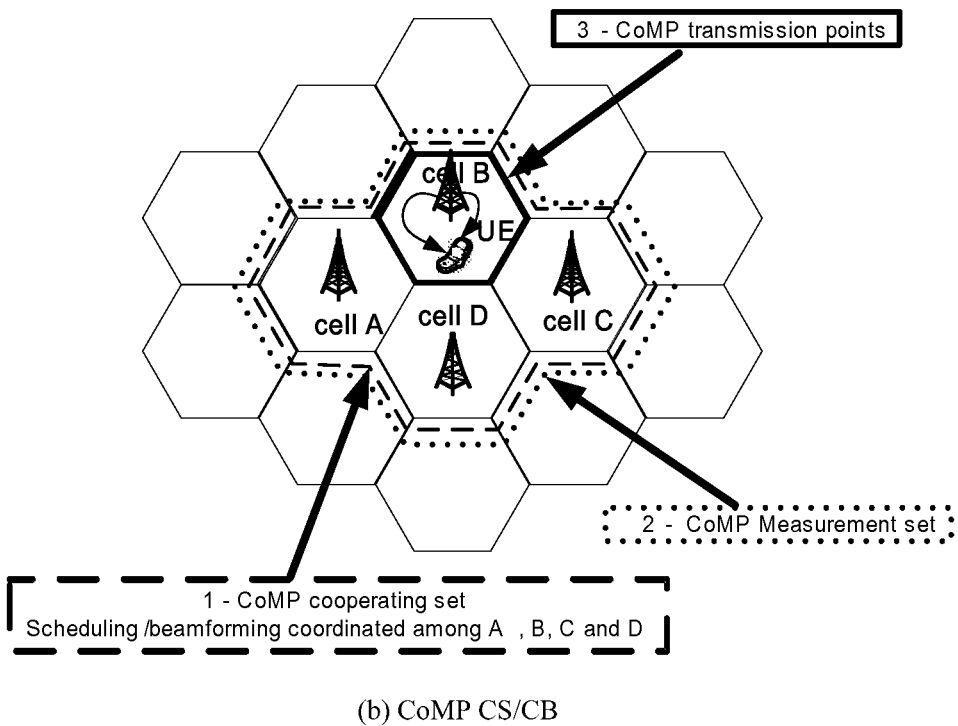
Figure 7:
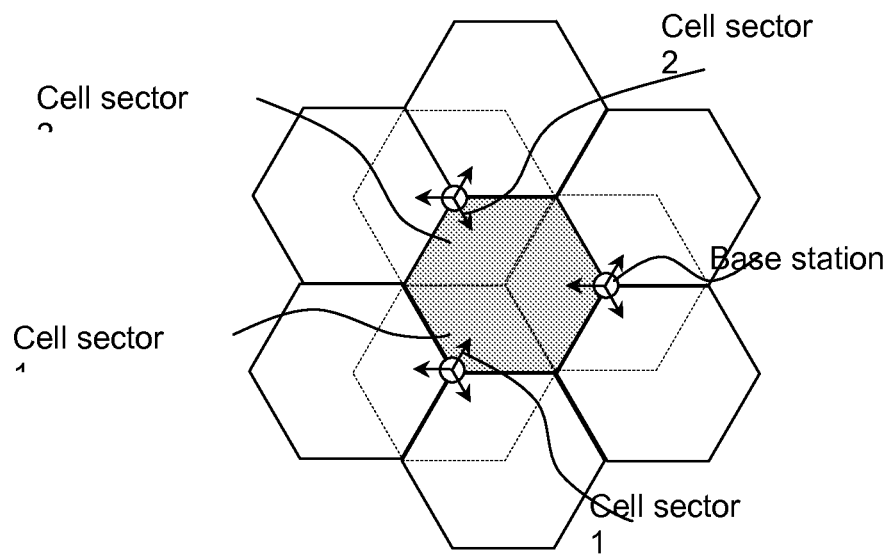
FIG. 7 schematically illustrates one way in which base stations, cells and cell sectors may be distributed in wireless communication systems of the kind to which the present invention may be applicable.
Figure 8:
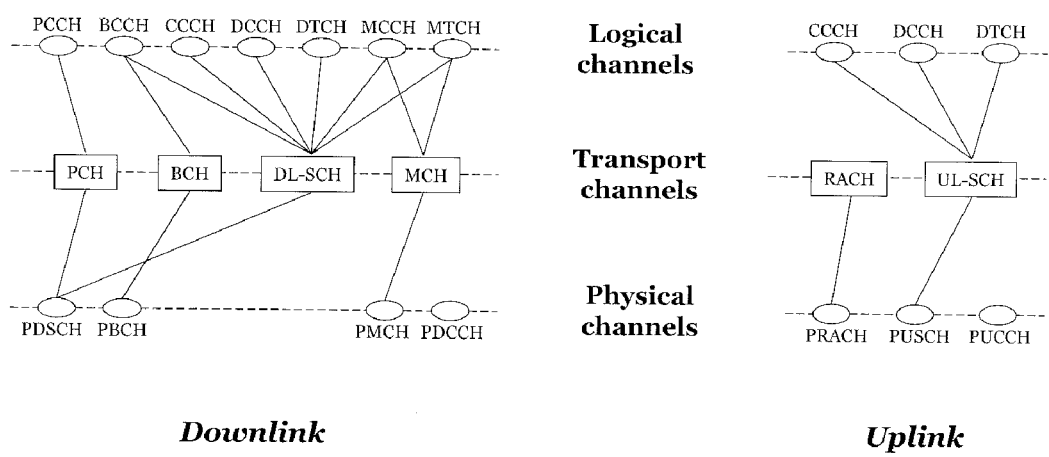
FIG. 8 illustrates the relationships among logical channels, transport channels and physical channels defined in LTE.

In the above explanation, the term "channel" (as in MIMO channel) has been used to describe the response of the entire radio link between a transmitter and a receiver. However, the term "channel" is also used in another sense to denote capacity reserved on the uplink, or downlink, for various purposes. Such channels can be defined at various levels of abstraction within the network. FIG. 8 shows some of the channels defined in LTE at each of a logical level, transport layer level and physical layer level, and the mappings between them. For present purposes, the channels at the physical layer level are of particular interest.

On the downlink, user data is carried on the Physical Downlink Shared Channel (PDSCH). There are various control channels on the downlink, which carry signaling for various purposes. In particular the Physical Downlink Control Channel, PDCCH, is used to carry scheduling information from base stations (called eNodeBs in LTE) to individual UEs.

Meanwhile, on the uplink, user data and also some signaling data is carried on the Physical Uplink Shared Channel (PUSCH), and control channels include a Physical Uplink Control Channel, PUCCH, used to carry signaling from UEs including channel quality indication (CQI) reports, precoding matrix information (PMI), a rank indication for MIMO, and scheduling requests. That is, in LTE, recommendations on transmission rank and which precoder matrix to use may be provided by the UE together with the reporting of CQI. These recommendations (which can be thought of as forms of CSI) guide the eNB in adapting the transmission rank, as well as the precoder and the coding rate and modulation to the current channel conditions. However, the eNB can override the UE recommendations.

Currently LTE supports both periodic CSI reports (on PUCCH or PUSCH, if transmitted) and aperiodic CSI reports (on PUSCH). Typically, aperiodic CSI reports can carry more information, since there are likely to be more resources available when PUSCH is transmitted. Therefore, in the case that a UE triggered CSI report would be more detailed than a periodic CSI report (e.g. more accurate, or covering more cells), or can be delivered more quickly, it could be advantageous for the UE to trigger such a CSI report, even if periodic CSI reports are already configured. Aperiodic CSI reports are commanded using a message on PDCCH, which also defines the UL resources to be used.

Known solutions to provide the network with CSI for multiple cells include periodic reports where the reported cell is changed cyclically, and aperiodic reports containing reports for all the configured cells.

However, in many cases good performance can be obtained if the network restricts scheduling of downlink transmission to the "best" available cell, rather than using more than one cell simultaneously. The same would apply to a subset of "good" cells.

In general it is in the interests of both user equipment (UE) and network to have effective channel state feedback (within reasonable limits on the UL signaling overhead), since this is likely to lead to both more efficient network operation in the DL and a better user experience.

The selection of the best sub-band(s) (i.e., part of a carrier) within a CSI report is already known and supported by LTE.

The proposed scheme is described mainly with reference to LTE, and is proposed as a potential improvement to LTE (i.e. LTE-Advanced). The invention is based on the recognition that efficient scheduling may be possible for the network where the identification of the "best" cell is performed by the UE, and in such a case CSI information would only be required for that cell. The invention may comprise a number of features, including means of selecting the cell for which CSI should be reported by the UE, and some means of indicating to the network the identity of this cell. This principle can be extended to multiple cells, i.e., the UE may select more than one cell for CSI reporting.

Figure 9:
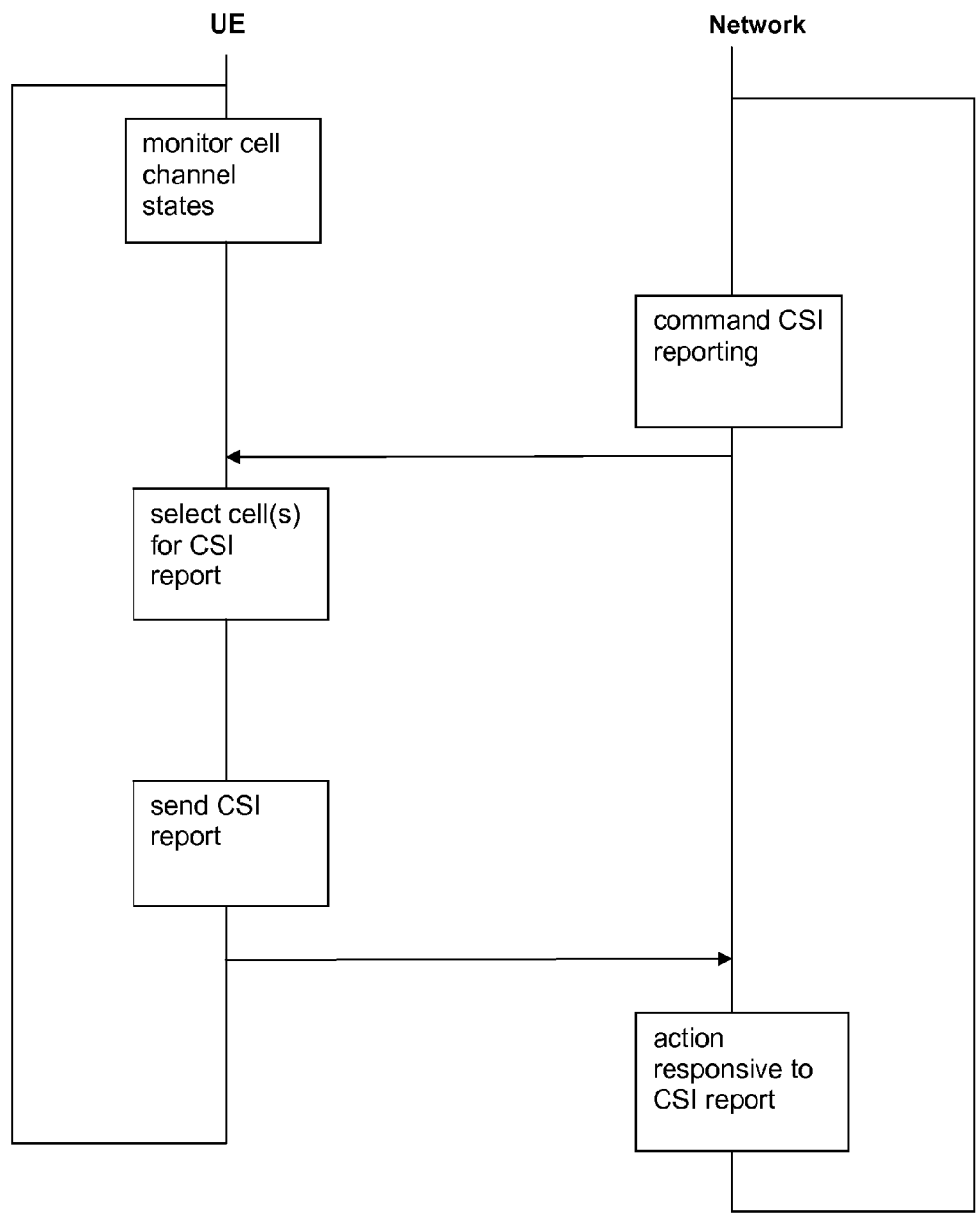
FIG. 9 is a flowchart of the main steps involved in a method embodying the invention.

The method is summarised in the flowchart of FIG. 9. It is assumed that the process begins with a UE in communication with the network via a plurality of cells and as will be seen, the UE monitors the channel states of the cells which it sees. In response to some trigger, here shown for example as an explicit request from the network, the UE decides one or more cells to be the subject of a CSI report (see below). The UE then sends to the network the CSI report for the selected cell(s). The network may respond to the report in some way by changing the criteria or assumptions used by the UE, for example by changing a transmission mode. Processing then returns to be the start of the process with the UE continuing to monitor channel states under the new conditions.

One novel feature of embodiments of the present invention is the modification of a CSI reporting structure, conventionally designed for reporting CSI for a single cell, for reporting CSI from multiple cells, the selection of the cell being made by the UE. This has the advantage of not significantly increasing uplink signaling overhead for CSI reporting for multiple cells compared with that required for a single cell using the prior art. Here, it is important to note that "reporting CSI from multiple cells" need not imply that the report(s) is/are sent to each respective cell. It may simplify the signaling if each CSI report in accordance with the present invention is sent to the same cell, regardless of the cell(s) which are the subject of each report. Also, for simplicity the following description will refer to CSI reports in the context of single cells, but it will be understood that a CSI report in accordance with the present invention may include information on a plurality of cells (in other words, a subset of the cells which the UE is currently in range of).

In general, CSI reports are likely to be most desirable for the cells with the best channel conditions, since these are likely to be able to provide speedy and efficient transmission of DL data. Possible cell selection criteria for CSI reporting based on channel state may include any one or more of the following:

Expected data rate (i.e. CQI)
Channel matrix
   Measured by the UE using CSI-RS or CRS or DRS
Channel spatial structure
   e.g. CMD as proposed in European Patent Application No. 09180243.9
SIR or SNR or SINR
Transmission rank preferred by the UE
Transmission mode preferred by the UE (e.g. CoMP or single cell, or MU/SU-MIMO)
Preferred precoding matrix (e.g. PMI)

Regarding the first of the above mentioned criteria, the UE can estimate the data rate achievable on a given radio link by measuring the channel matrix and SINR (e.g. from reference symbols). This data rate would be under the assumption that CSI such as transmission rank and PMI is reported to the BS. Typically the channel will change with time. At any given time the UE can also estimate the data rate that would be achieved using the previously reported CSI for that channel, given the currently observed channel matrix and SINR. For multiple radio links (i.e. with multiple radio channels) the UE can work out the total achievable data rate, summed over all the radio links, using the most recently reported CSI for each radio link. It can then work out the total data rate if CSI was assumed to be reported for a given radio link, and repeat this for the assumption of CSI being reported for each one of the radio links considered, in turn.

There is some overlap among the above criteria. The correlation matrix distance (CMD) may be regarded as a measure of rate of change in the channel matrix, and the significance of the change in the PMI can be evaluated using the CMD. CMD is discussed in the following document:

M. Herdin, N. Czink, H. Ozcelik, and E. Bonek, "Correlation matrix distance, a meaningful measure for evaluation of non-stationary MIMO channels", in IEEE VTC spring 2005, vol. 1, 2005, pp. 136-140.

The above CMD may be thought of as a "narrowband" CMD. An alternative "extended" or "wideband" CMD is proposed in a co-pending European Patent Application 09180243.9 by the present applicant, entitled "Feedback Interval Control", the content of which is incorporated by reference. Either or both forms of CMD may be applied in the present invention.

In LTE Release 8/9 the UE typically computes a single PMI. Considering that the preferred precoder in LTE Release 10 may be specified by two matrix indices referring to entries from different codebooks, the relevant change could be in one or both metrics or indices. In LTE Release 10 more than one PMI may be derived (e.g. best/worst companion).

As will be apparent, most if not all of the above criteria involve information known by the UE rather than necessarily the network as a whole. The novel CSI report in accordance with the present invention may therefore be user-initiated, in other words triggered by the UE of its own volition. On the other hand, it may alternatively be a report made in response to a request (explicit or implied) from the network. The most important feature of the CSI report in accordance with the present invention is that its content (i.e. the cell(s) the subject of the report) is determined by the UE.

CSI reports are also likely to be desirable for cells where the channel state has changed significantly (i.e. existing CSI information is obsolete). As well as using the metric mentioned above, other criteria could also apply such as:

Rate of change of channel state
A general function of channel state at two (or more) time instances Thus, in one example method of the present invention, CSI for the "best" cell is reported unless that has not changed significantly (or has only been recently reported, e.g. within a predetermined threshold time period), in which case the second best cell is reported. (Here, the "best" cell is the one with the highest achievable data rate. The UE calculates the preferred transmission rank and preferred precoding matrix in order to determine the data rate achievable for each cell). Equivalently, the network may assume that for any cell the most recently received CSI report for that cell should be used. Under this assumption a possible criterion for cell selection is as follows:—under the assumption that the network transmits to the UE using all the available cells, based on the most recent available CSI reports for each cell, the UE reports the CSI for the cell for which updating the CSI will give the largest increase in total data rate. Incidentally, with regard to "significantly" in the above context, it may be assumed that a significant change might be 20% of the data rate for instance. Thus, a value such as 20% is set as a threshold in the UE. One possibility is to select, as a subject of the CSI report, the cell with the largest absolute change in data rate since the last CSI report for that cell.

A modification of the above is to take into account the preferred transmission mode: the UE could select, as subject of the CSI report, the cell which can support the transmission mode offering the highest data rate.

Change in UE location, perhaps using technology such GPS together with a database of known cell locations, may be used to trigger a CSI report for a particular cell (e.g., if the new location corresponds to entering the coverage area of a new cell).

Selection of cell(s) as the subject of CSI reports may also (i.e. alternatively, or in addition to, the criteria mentioned above) be made dependent on a change in the status of a cell, which can reflect the ability of the UE to receive particular transmission modes, number of spatial streams or data rates, such as a different number of Tx antennas, or a change in number of available DL subframes (e.g., due to MBMS reconfiguration), or activation/deactivation of carriers in CA.

Cell selection for CSI reporting may also depend on a change in the status or available capability of the UE, which may impact upon the ability of the UE to receive transmissions from a particular cell. For example, the number of transceivers (end hence number of cells or available frequency bands) might be temporarily reduced if some UE hardware resources are being used for another purpose, such as receiving a broadcast transmission (e.g., MBMS).

A further possible trigger for a CSI report, in accordance with the present invention, is a change at the application level in the UE, (e.g. QoS requirements). For example if the application is running short of data (e.g. for streaming), then additional CSI reports may lead to a higher data rate being available.

The above criteria all concern changes in one or more parameters affecting the communication of the UE with a given cell. However, static criteria (absolute values of parameters) may also be taken into account. Thus, other possible conditions for cell selection include:
  user equipment location;
  user equipment status;
  cell status;
  carrier frequency of the cell;
  cell identity.

Here, "cell status" may refer for example to any one or more of:
  number of available transmit antennas at a base station;
  number of available downlink subframes;
  the ability of a cell to support a particular data rate;
  the traffic loading of a cell.

Time-based criteria can also be applied. The direct use of the elapsed time from the most recent CSI report is well known (i.e., periodic reporting). However, novel criteria can be applied in the present invention, such as the transmission of a CSI report for a cell when the elapsed time, following a CSI-triggering event without a "normal" CSI report for that cell having been transmitted, exceeds a threshold. A "normal" CSI report may be either a periodic CSI report or an aperiodic CSI report commanded by the network. Thus, novel CSI reports in accordance with the present invention may augment CSI reporting as already provided for in LTE. Thus, for example, the best cell(s) would be provided with novel CSI reports in accordance with the present invention as well as standard CSI reports, with remaining cells (i.e. any cells not in the subset selected by the UE) left to be dealt with by standard CSI reporting.

Alternatively, CSI reports in accordance with the present invention could be used in place of conventional network-commanded or network-configured CSI reports. Additionally, the cell selection may depend on the occurrence of reference symbols (CSI-RS in LTE-Advanced) for the different cells. It would be desirable to send the CSI report shortly after the transmission of the CSI-RS, in which case this CSI-RS transmission is used as a trigger to send a CSI report and also to select a report of CSI for the cell transmitting the CSI-RS. For LTE it is envisaged that CSI-RS transmissions would be made using a regular pattern in the time domain, determined by the BS and signaled to the UE.

For example, in the case that the relevant cells all transmit CSI-RS simultaneously, and the UE measures the channel state from these and periodic CSI reporting instants have been configured, if the interval between CSI reports is less than the interval between CSI-RS transmission, then it may be possible to transmit more than one CSI report between each occurrence of CSI-RS. (This may be necessary owing to limited resource availability for CSI reporting on the uplink, and/or desirable to improve reliability by repeating reports). The first such report following CSI-RS transmission can be based on the best cell, and the second report (if present) based on the next best cell, and so on. Since the channel is likely to change with time following CSI-RS transmission, the CSI report most immediately following the CSI•RS measurement is least likely to be rendered obsolete by channel changes. Therefore following this procedure means that the CSI report for the best channel is less likely to be obsolete than later CSI reports.

Turning now to the specific signaling to allow the UE to provide CSI reports in the above manner, this is based on the assumption that mechanisms for CSI reporting are already available, and can be used for the envisaged CSI reports or can otherwise be modified appropriately. For example, periodic and aperiodic CSI reports already defined for LTE may need an additional mechanism to indicate which cell the CSI report applies to. This could be provided implicitly. For example periodic reports could cycle though a set of cells, or the cell for an aperiodic report could be defined by the cell on which the PDDCH carrying the CSI report command is sent.

An explicit indication is likely to be more flexible and is thus preferred in an embodiment of the present invention. This can be conveniently added to an existing CSI message structure on PUCCH or PUSCH, for example by:
  Using reserved value(s)
  Replacing existing bit(s)
  Extending CSI message structure with additional bit(s)

For example, if CSI is to be reported for one cell from one of up to 5 carriers (e.g. cells at different frequencies), this would require a 3 bit indication. Further, an aperiodic CSI report may contain CSI reports from more than one cell, in which case suitable signaling bits can be provided for indicating, for example, the number of CSI reports and to which cells they apply.

As will be apparent from the above, a CSI report in accordance with the present invention may either be a report for a single cell (with other cells being covered by successive individual reports), or a "combined" CSI report may be constructed to provide CSI on a plurality of cells simultaneously.

Conventionally, a CSI message of x bits is applied to a channel coder potentially generating say 3x bits. Some bits are punctured (i.e. deleted) to give z bits (where z<3x). The z bits are transmitted over the channel. The z bits are processed at the receiver to recover the message of x bits.

To denote the cell selection made in accordance with the present invention, adding a new indicator for the cell can be done as follows: a CSI message of x bits plus c bits (for the cell indicator) is applied to a channel coder potentially generating say 3x+3c bits. Some bits are punctured (i.e. deleted) to give z bits (where z<3x+3c). The z bits are transmitted over the channel. The z bits are processed at the receiver to recover the message of x bits plus the c bit cell indicator. Here x=10, z=24 and c=3 could be suitable numbers of bits by way of example only.

To implement the method of the invention in suitably-equipped UEs, some additional configuration will be needed.

The network configures the UE (e.g. with RRC signaling) according to one or more of the following:

The set of cells for which CSI reports can be selected

The cell selection criteria

A more concrete embodiment will now be outlined with reference to LTE-A as an example.

In this embodiment, the network operates using FDD and comprises one or more eNodeBs, each controlling one or more downlink cells, and corresponding uplink cells. Some of the cells controlled by a given eNodeB have different carrier frequencies. A given terminal (UE) may simultaneously receive and decode signals transmitted by more than one cell. In typical configurations, for example, the cells received by a UE may be controlled by the same eNodeB but have different carrier frequencies (Carrier Aggregation) and/or be controlled by different eNodeBs and have the same carrier frequencies (CoMP).

In order to schedule the appropriate use of transmission resources per cell in time, frequency and spatial domains, the UEs provide the eNodeBs with information on the status of the downlink channel (CSI), derived from measurements made on reference symbols transmitted in each cell by the corresponding eNodeB. Uplink signaling mechanisms available in LTE Release 8 and 9 support the reporting CSI information for one cell (the serving cell) from a given UE. CSI reports may be periodic (with timing and periodicity configured by the network) or aperiodic, where the eNodeB commands the UE to transmit a CSI report at a particular instant.

In accordance with the principles outlined earlier, in consideration of defined criteria, the UE determines at least one cell for which the CSI is reported. In the present embodiment, the CSI for that cell is then reported to the network using the same signaling mechanisms as for LTE Release 8 and 9. The CSI message structure is modified according to one of the methods outlined above in order to carry the information on which cell the CSI report relates to.

Thus, to summarise, the invention provides a scheme for transmission of channel state feedback information where the relevant cell is selected by the mobile terminal. This is intended to reduce the uplink feedback overhead used for multi-cell multiple-input multiple-output (MIMO) transmissions. The invention comprises a novel method of configuring and arranging the transmission of the CSI report.

In any of the aspects or embodiments of the invention described above, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it could, for example, be in the form of a signal such as a downloadable data signal provided from an Internet website, or it could be in any other form.

It is to be clearly understood that various changes and/or modifications may be made to the particular embodiment just described without departing from the scope of the claims.

INDUSTRIAL APPLICABILITY

In a wireless communication system, network configured periodic or network commanded, aperiodic transmission of CSI (Channel State Information) by the terminal can provide the base station with current knowledge of the DL channel state for each mobile terminal. This allows selection of transmission parameters and scheduling of transmissions, for example to maximize throughput metrics. However, in the case where the network can use more than one cell for data transmission to the terminal, knowledge of the channel state would be required for the paths from the multiple cells. Furthermore, in order to have timely channel state knowledge, frequent CSI reports would be required (periodic and/or aperiodic). Therefore reporting by the UE of CSI for multiple cells implies a considerable uplink overhead. An embodiment of the present invention allows the UE to select the cell (or subset of cells) for which CSI is reported, thus reducing this overhead. The potential benefits of reducing the uplink overhead include lower interference to other UL transmissions, lower power consumption by the terminal and less use of UL system resources.

The invention claimed is:

1. A method for use in a multiple-input multiple-output communication network in which:

the network comprises a plurality of cells provided by one or more base stations operable to transmit signals on at least one downlink to, and receive signals on at least one uplink from, a user equipment, the user equipment is operable to feed back to the network reports on channel state information, CSI, for one or more of the cells; and base stations are operable to adapt downlink signals to the user equipment based on the CSI reports, the method comprising:

the user equipment selecting at least one cell to be the subject of a CSI report.

2. The method according to claim 1 further comprising the user equipment sending the CSI report with an indication of the subject cell(s).

3. The method according to claim 2 wherein the indication of the subject cell(s) is made by setting one or more bits of the CSI report.

4. The method according to claim 1 wherein the selecting step selects the subject cell(s) by taking account of one or more of:

user equipment location;

user equipment status;

cell status;

carrier frequency of the cell;

cell identity;

channel state of a cell;

change in user equipment location;

change in user equipment status;

change in cell status;

time elapsed since a CSI report for a cell; and receipt of a CSI reference signal for a cell.

5. The method according to claim 4 wherein the selecting step takes into account channel state of a cell according to one or more of the following criteria:

expected data rate of communication with the cell;

channel matrix for the cell;

channel spatial structure;

signal to interference ratio, SIR, or signal to noise ratio, SNR transmission rank preferred by the user equipment transmission mode preferred by the user equipment;

preferred precoding matrix of the user equipment;

expected data rate;

rate of change of channel state;

function of channel state at two or more timings.

6. The method according to claim 4 wherein the selecting step takes into account change in user equipment location by determining that the user equipment has entered a coverage area of a cell.

7. The method according to claim 4 wherein the selecting step takes into account user equipment status according to one or more of the following criteria:
- number of transceivers available at the user equipment;
- change at the application level at the user equipment.

8. The method according to claim 4 wherein the selecting step takes into account cell status according to one or more of the following criteria:
- number of available transmit antennas at a base station;
- number of available downlink subframes;
- the ability of a cell to support a particular data rate;
- the traffic loading of a cell;
- change in number of available transmit antennas of the base station;
- change in number of available downlink subframes;
- activation or deactivation of carriers in carrier aggregation.

9. The method according to claim 1 wherein the selecting step includes finding, as a candidate subject of the CSI report, a best cell with which the user equipment should communicate.

10. The method according to claim 9 wherein the best cell is determined according to one or more of:
- maximum achievable data rate;
- expected data rate;
- expected spectral efficiency.

11. The method according to claim 9 wherein the criteria include at least one of elapsed time and rate of change of channel state, and the selecting step includes selecting at least one other cell as subject of the CSI report in the event that the elapsed time since the last CSI report for the best cell, or rate of change of channel state of the best cell, is below a threshold.

12. The method according to claim 1 wherein the selecting and sending steps are user equipment-initiated.

13. The method according to claim 1 further comprising the network sending reference signals to the user equipment for each cell, and the selecting and sending steps are responsive to at least one reference signal received by the user equipment, the user equipment responding to receipt of the reference signals by sending a CSI report for the best cell and thereafter a CSI report for at least one other cell.

14. The method according to claim 1 wherein the CSI report covers more than one subject cell and the CSI report indicates the number of cells covered.

15. A user equipment, UE, for use in a multiple-input multiple-output communication network in which:
- the network comprises a plurality of cells provided by one or more base stations operable to transmit signals on at least one downlink to, and receive signals on at least one uplink from, the UE,
- the UE is operable to feed back to the network reports on channel state information, CSI, for one or more of the cells; and
- base stations are operable to adapt downlink signals to the UE based on the CSI reports;
- the UE being configured to select at least one cell to be the subject of a CSI report, and to send the CSI report for the subject cell(s).

* * * * *